(12) United States Patent
Hanson

(10) Patent No.: US 6,215,859 B1
(45) Date of Patent: Apr. 10, 2001

(54) DELIVERY OF URGENT MESSAGES BY INTEGRATED FORCED DELIVERY AND VOICE MAILBOX

(75) Inventor: Bruce Lowell Hanson, Little Silver, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/942,284

(22) Filed: Oct. 2, 1997

(51) Int. Cl.[7] .................................................. H04M 1/64
(52) U.S. Cl. ...................................... 379/88.22; 379/88.12
(58) Field of Search ................................. 379/67.1, 88.11, 379/88.12, 88.15, 88.19, 88.2, 88.21, 88.22, 88.23, 142

(56) References Cited

U.S. PATENT DOCUMENTS

| 5,128,982 | 7/1992 | Dugdale et al. . |
|---|---|---|
| 5,243,643 | 9/1993 | Sattar et al. . |
| 5,255,305 | 10/1993 | Sattar . |
| 5,375,161 | 12/1994 | Fuller et al. . |
| 5,390,236 | 2/1995 | Klausner et al. . |
| 5,423,062 | 6/1995 | Sakakura . |
| 5,452,341 | 9/1995 | Sattar . |
| 5,559,611 | 9/1996 | Bloomfield et al. . |
| 5,608,786 | 3/1997 | Gordon . |
| 5,617,539 | 4/1997 | Ludwig et al. . |
| 5,652,789 | 7/1997 | Miner et al. . |
| 5,717,741 | * 2/1998 | Yue et al. ................................. 379/67 |
| 5,754,628 | * 5/1998 | Bossi et al. ........................ 379/88.12 |
| 5,768,356 | * 6/1998 | McKendry et al. .................. 379/201 |
| 5,802,466 | * 9/1998 | Gallant et al. ...................... 379/67 X |
| 5,889,839 | * 3/1999 | Beyda et al. ....................... 379/88.12 |
| 5,995,594 | * 11/1999 | Shaffer et al. ..................... 379/88.12 |

* cited by examiner

Primary Examiner—Scott L. Weaver
(74) Attorney, Agent, or Firm—Morgan & Finnegan, L.L.P.

(57) ABSTRACT

A method for delivering voice mail to an intended recipient in which a voice-mail message is recorded for a recipient of the message, an urgent status is determined for the voice-mail message, a signal is sent for activating a message waiting indicator for the recipient, and a call is generated to the message recipient for delivering the message. A call is generated to the message recipient immediately after a telephone line for the recipient becomes not busy when the telephone line for the message recipient is busy. Similarly, a call is generated to the message recipient based on a predetermined schedule when the call generated to the message recipient is unanswered. The predetermined schedule includes a predetermined call retry interval and a predetermined call retry duration.

16 Claims, 2 Drawing Sheets

DELIVERY OF URGENT MESSAGES BY INTEGRATED FORCED DELIVERY AND VOICE MAILBOX

BACKGROUND OF THE INVENTION

1. Field of the Invention

The present invention relates to the field of telecommunications. More particularly, the present invention relates to a method for delivering a voice-mail message to an intended recipient of the message.

2. Description of the Related Art

Voice-mail and voice-messaging systems are known in which a caller can record a message for an intended recipient of the message and select an urgent delivery status. The known systems then queue the recorded message so that when the intended recipient accesses the voice-mail system, the message is queued for delivery with an urgent status. Alternatively, a special message waiting indicator can also be activated by such a system emphasizing that a message having an urgent status is waiting. Nevertheless, urgent messages are not necessarily received by the intended recipient in a timely manner because the intended recipient is not adequately alerted to the urgent status of a waiting message.

What is needed is a way to deliver urgent voice-mail messages to an intended recipient in a timely manner by adequately alerting the recipient of the waiting urgent message.

SUMMARY OF THE INVENTION

The present invention provides a method for delivering urgent voice-mail messages to an intended recipient in a timely manner by adequately alerting the recipient of the urgent message. The advantages of the present invention are provided by a method in which a voice-mail message is recorded for a recipient of the message, an urgent status is determined for the voice-mail message, a signal is sent for activating a message waiting indicator for the recipient, and a call is generated to the message recipient for delivering the message. According to the invention, a call is generated to the message recipient immediately after a telephone line for the recipient becomes not busy when the telephone line for the message recipient is busy. Similarly, a call is generated to the message recipient based on a predetermined schedule when the call generated to the message recipient is unanswered. The predetermined schedule includes a predetermined call retry interval and a predetermined call retry duration with the predetermined call retry interval being a predetermined period of time between each call retry and the predetermined call retry duration being a predetermined period of time for which call retries are attempted.

When the message is intended for a plurality of recipients, an urgent status is determined for the voice-mail message for at least one of the plurality of recipients. A call is generated to each respective message recipient for which the message has an urgent status immediately after a telephone line for the recipient becomes not busy. A call is generated to each respective message recipient for which the message has an urgent status based on a predetermined schedule when the call generated to the message recipient is unanswered.

BRIEF DESCRIPTION OF THE DRAWING

The present invention is illustrated by way of example and not limitation in the accompanying figures in which like reference numerals indicate similar elements and in which.

DETAILED DESCRIPTION

The present invention uses both forced delivery and mailbox messaging in combination for ensuring timely delivery of an urgent message and is particularly effective when message waiting indicators for a mailbox system have a limited notification capability. The present invention can be utilized with virtually any voice mailbox/messaging system. For example, when the present invention is embodied as a call answering system, a calling party is given an option for specifying urgent delivery of a voice-mail message. Once the message is recorded, the system turns on a message waiting indicator and attempts to call the called party to play the message. Whether the initial call was unanswered or the called party's line is busy, the system retries the call according to a predetermined schedule until the called party is reached or otherwise separately retrieves the message. The call to deliver the urgent message uses a distinctive ringing, such as three burst rings. The present invention can also be embodied as a sender-pays mailbox, in which case the system attempts to deliver an urgent message to an intended recipient by calling the recipient according to a predetermined schedule until the intended recipient is reached or otherwise separately retrieves the message.

Figure 1:
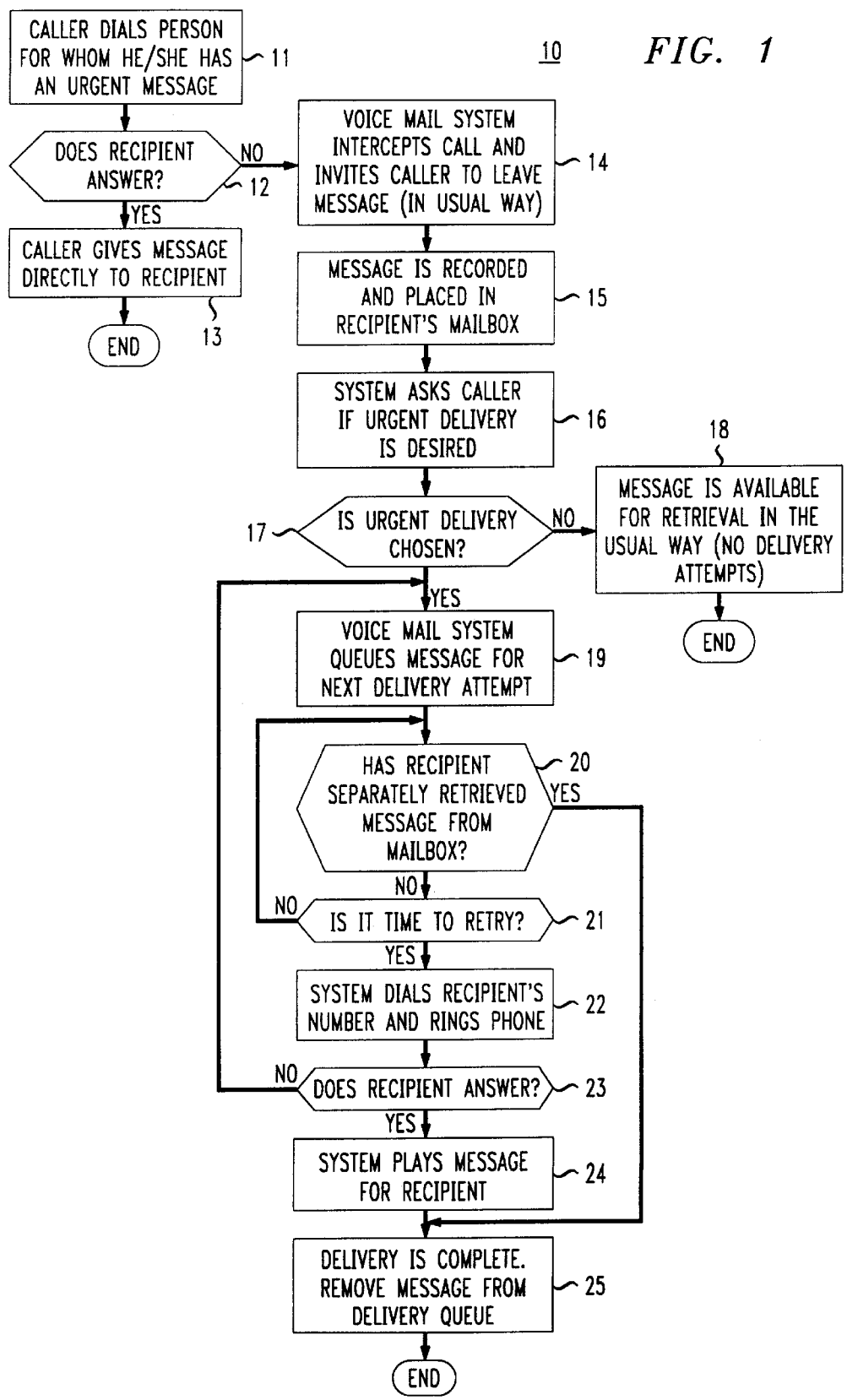
FIG. 1 shows a flow diagram for delivering an urgent message for a call answering/voice-mail system according to the present invention.

FIG. 1 shows a flow diagram 10 for a method for delivering an urgent message for a call answering/voice-mail system according to the present invention. Systems of this type are characterized by being in the call path to a recipient so that if the recipient does not answer a call, the call is intercepted by the voice mail system, such as a telephone company voice-mail system or a business Audix™ system.

At step 11 in FIG. 1, a calling party calls another party for communicating an urgent message. If the called party answers at step 12, the calling party can personally deliver the message at step 13. If, at step 12, the called party does not answer the call or the called party's line is busy, the voice-mail system answers the call at step 14, and invites the calling party to leave a message. The calling party records a message at step 15. At step 16, the voice-mail system queries the calling party by way of, for example, a selection from a voice menu, whether urgent delivery is desired. The voice-mail system can optionally limit callers who can choose urgent delivery, for example, by entry of a PIN, by using a caller ID or, depending upon the capability of the voice mail system, by using well-known voice recognition techniques for speaker identification purposes. If, at step 17, urgent delivery is not desired, flow continues to step 18 where the message is made available for retrieval in a usual manner.

If, at step 17, urgent delivery is desired, the voice mail system queues the message for the next delivery attempt at step 19, and sends a signal for activating a message waiting indicator for alerting the called party in a well-known manner, such as for activating a stutter dial tone, for displaying a voice-mail icon on a display telephone or CRT display, or for illuminating a lamp on a telephone. At step 20, the voice-mail system determines whether the called party has separately retrieved the urgent message from the mailbox. If so, flow continues to step 25, where the message is removed from the mailbox, and a signal is sent for deactivating the message waiting indicator with respect to the urgent message. If, at step 20, the urgent message has not been separately retrieved, flow continues to step 21 where the system determines whether it is time to attempt a call to the called party. If it is not time, then flow returns to step 20.

According to the invention, if the called party's line was busy when the calling party initially called, the voice-mail system waits until called party hangs up and then, at step 21, it is determined that it is time to call the called party by the called party's line being on-hook. At step 22, the system calls the called party using a distinctive ringing, such as three burst rings, that indicates an attempt by the system to deliver an urgent message. At step 23, it is determined whether the called party answers the call. If not, flow returns to step 20. The voice-mail system continues to call the called party using the distinctive ringing based on a predetermined schedule, such as once every 15 minutes for a 2 hour period, until the called party answers at step 23, a call urgency time length threshold for attempting delivery is exceeded, or the called party retrieves the message by separately accessing the voice-mail system and listens to the urgent message. Alternatively, the parameters of the predetermined calling schedule can depend on whether a Special Intercept Tone (SIT) is received indicating, for example, all trunks busy, in which case the voice mail system attempts to call the called party more frequently than when each call attempt is determined to be unanswered.

When the called party answers, the voice-mail system generates a voice message in a well-known manner at step 24 informing the called party that an urgent message has been left for the called party and begins to play the message using well-known message playback techniques or well-known voice signal generating techniques. The called party is provided all of the same message handling options as for other messages, such as save, delete, etc. Flow continues to step 25, where the urgent message is removed from the delivery queue and a signal is sent for deactivating the message waiting indicator with respect to the urgent message.

The advantages of the first embodiment of the present invention are illustrated by the following example. A computer network user, who has just experienced a critical network failure, calls the network administrator for the purpose of immediately notifying her of the failure. Nevertheless, the network administrator has briefly stepped out of her office at that moment, so her phone rings several times before it is answered by a voice-mail system. The network user records a message and selects urgent delivery. The voice-mail system starts calling the system administrator's phone at 3 minute intervals, for example, so that her phone will ring shortly after she returns to her office and she receives the urgent message. Without the urgent delivery aspect of the present invention, the system administrator might have decided that there were other important things to do, and not immediately retrieve her voice mail messages. Consequently, an undesirably long time might have otherwise passed before the network user's message was retrieved.

In the situation when the network administrator is involved with a lengthy conference call, several messages may be delivered into the network administrator's mailbox along with the urgent message regarding the network failure so that the message waiting indicator would be activated. Since the message from the network user has been specified as urgent, as soon as the network administrator ends the conference call, the voice-mail system calls her phone for delivering the urgent message. This occurs before she has a chance to slip out to lunch and before she retrieves her other, lower priority messages.

In the situation when the administrator has gone to the dentist and the network user left the urgent delivery message, the voice-mail system would be periodically calling her office phone. While waiting in the dentist's office, the system administrator can check her messages, and the urgent delivery message will be delivered to her. Once the message is retrieved, the voice-mail system stops attempting to deliver it because it is aware that she has received it.

Figure 2:
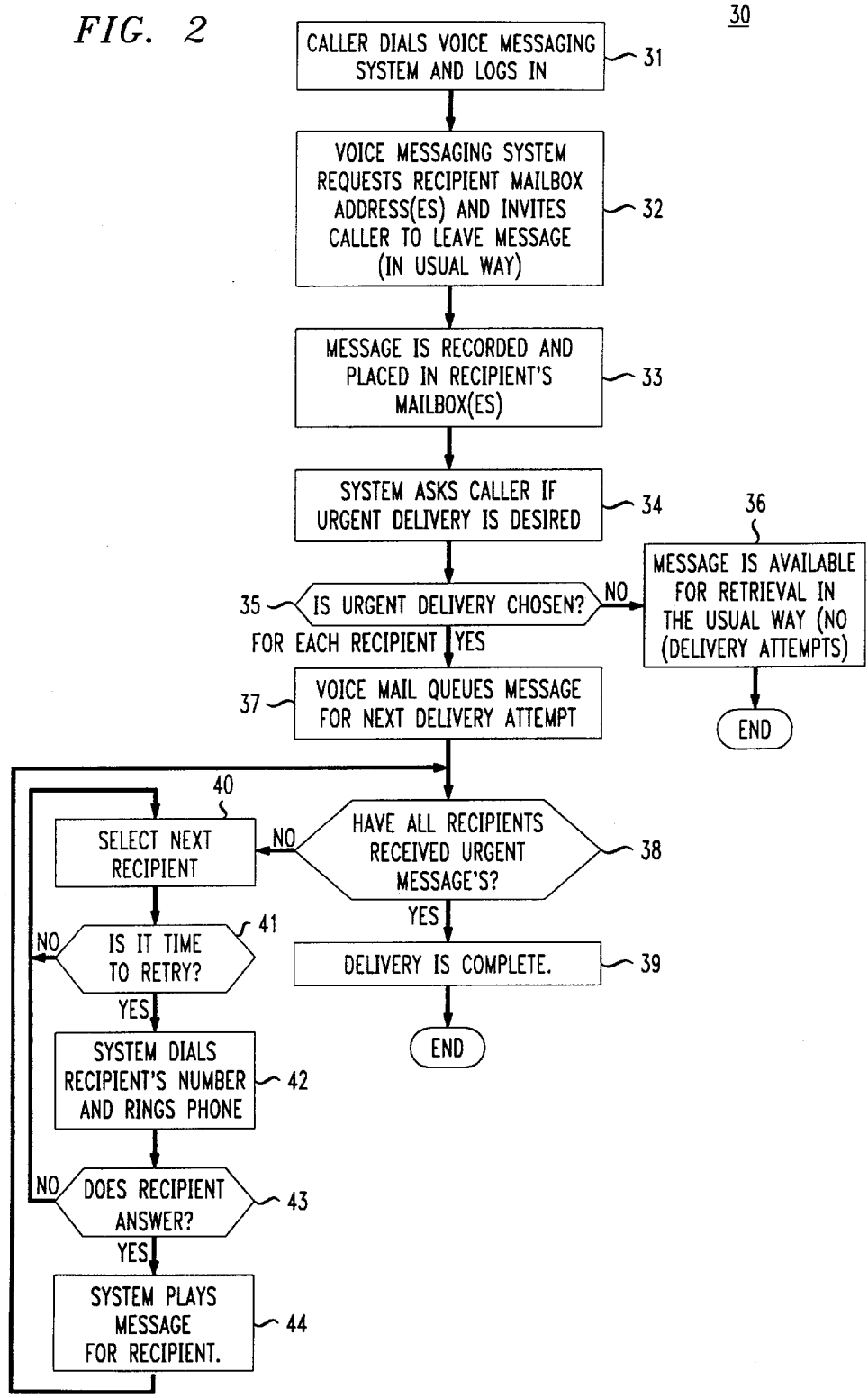
FIG. 2 shows a flow diagram for delivering an urgent message for a dial-up voice-messaging system according to the present invention.

FIG. 2 shows a flow diagram for a method for delivering an urgent message for a dial-up voice-messaging system according to the present invention. This type of a system is characterized by a mailbox system that users dial into for either sending or receiving messages. This type of mailbox system does not intercept incoming calls for recipients. This embodiment of the present invention allows delivery of the same urgent message to one or more recipients.

For stand-alone mailboxes of all types, such as a sender-pays type mailbox, the present invention works similarly to a voice-mail system, but with two exceptions. Since this type of mailbox system does not intercept the mailbox holder's busy or unanswered calls, a person wishing to send an urgent message needs to access their mailbox for creating the voice message to send. The message creator can also address the same message to multiple recipients, in which case the present invention attempts to reach each recipient in manner similar to that described in connection with FIG. 1. The present invention provides an attractive feature for this kind of "stand alone" mailbox system because such a sender-pays type mailbox system does not provide a visually observable message waiting notification to an intended recipient.

In FIG. 2, a caller dials the voice-messaging system at step 31 and logs in. At step 32, the voice-messaging system requests the mailbox address(es) of the individual message recipient(s) and invites the caller to leave a message. The caller can identify a plurality of recipients as an aliased group. At step 33, the message is recorded and placed in each recipient's mailbox. At step 34, the system asks the caller whether urgent delivery is desired. If, at step 35, urgent delivery is not desired, flow continues to step 36 where the message is made available for retrieval in the usual way. If, at step 35, urgent delivery is desired, the voice-messaging system queues the message for the next delivery attempt for each intended recipient at step 37, and a signal is sent for activating a message waiting indicator for alerting the called party in a well-known manner, such as for activating a stutter dial tone. For this embodiment of the present invention, that is, for a stand-alone mailbox system, the system sends a signal to the central office serving each intended recipient for activating a distinctive ringing in a well-known manner, such as three burst rings, for indicating an urgent message is waiting for the intended recipient. Alternatively, the stand-alone mailbox system can call each intended recipient from a telephone number that has been registered with the central office serving each intended recipient and that causes the central office to generate a distinctive ringing of the intended recipient's telephone.

At step 38, the voice-messaging system determines whether all intended recipients have received the urgent message by either separately accessing the mailbox or by the voice-messaging system delivering the urgent message in according with the invention. If all intended recipients have received the urgent message, flow continues to step 39 where delivery of the urgent message is complete and a signal is sent for deactivating the message waiting indicator with respect to the urgent message. If, at step 38, all intended recipients have not received the urgent message, flow continues to step 40 where an intended recipient who has not received the message is selected. Flow continues to step 41 where the system determines whether it is time to attempt a call to the selected intended recipient. If it is not time for calling that intended recipient, flow continues back to step 40 where the next intended recipient who has not received the message is selected.

If, at step 41, it is determined that it is time to call the selected intended recipient, flow continues to step 42 where the system calls the selected recipient. At step 43, the system determines whether the selected recipient answers the call. If not, flow returns to step 40 where the next intended recipient who has not received the urgent message is selected. If at step 43, the intended recipient answers the call, the voice-messaging system generates a voice message in a well-known manner at step 44 informing the recipient that an urgent message has been left for the recipient and begins to play the message using well-known message playback techniques or well-known voice signal generating techniques. The recipient is provided all of the same message handling options as for other messages, such as save, delete, etc. A signal is then sent for deactivating the message waiting indicator for the recipient with respect to the urgent message. After the urgent message is played at step 44, flow continues to step 38 where it is determined whether all intended recipients have received the urgent message. If not, flow continues to step 40 where the next intended recipient who has not received the urgent message is selected.

The voice-messaging system continues to call the intended recipients who have not received the urgent message based on a predetermined schedule until each intended recipient answers at step 43, a call urgency time length threshold for attempting delivery is exceeded, or each intended recipient retrieves the message by accessing the voice-messaging system and listening to the urgent message. Alternatively, the parameters for the predetermined calling schedule can depend on whether an intended recipient's line is determined to be busy, or a Special Intercept Tone (SIT) is received indicating, for example, all trunks busy. In both cases, the voice-messaging system attempts to call the intended recipient more frequently than for the case when each call attempt is determined to be unanswered.

The advantages of the second embodiment of the present invention are illustrated by the following example, in which a company provides a dial-in voice messaging system for each member of a field sales team that spends most of the time of the road. The dial-in voice messaging system enables team members to leave messages for each other or receive messages from clients. Most of sales team members have a reach number, that is, a telephone number at which they can most likely be reached at the moment, such as a home phone, a car phone or an office phone. One customer of a particular sales team member has just discovered a flaw in one of the company's products. The sales team member suspects that the same flaw appears in every unit that was shipped. The team member must get a message regarding the suspected flaw to the rest of the sales team as quickly as possible. The team member dials the voice-messaging system, enters her mailbox, specifies the sales team by a group alias as the recipients for her message, records her message, and requests urgent delivery. The system now attempts to deliver the message to the reach number for each recipient, while also placing the message in each of their respective mailboxes so that if they independently retrieve their messages, the message will be marked urgent.

For both embodiments of the present invention, when the call is answered, the message can be played or a determination can be made whether the answered call is a "live answer" or answered by an answering device or machine by using well-known algorithms, such as being based on the length of the speech energy received after the call is answered. If it is determined that the answer is a "live answer", the message is played. If it is determined that an answering machine answered the call, the call may be abandoned or the message might be recorded, depending on the system. It would not be desirable, for example, for a voice-mail system to record the same message into itself for the called party. Another optional feature for both embodiments of the present invention is that the sender is notified that the message has been delivered by, for example, a pre-recorded message status call-back message.

While the present invention has been described in connection with the illustrated embodiments, it will be appreciated and understood that modifications may be made without departing from the true spirit and scope of the invention.

What is claimed is:

1. A method of delivering a voice-mail message, comprising the steps of:
    recording a voice-mail message for a recipient of the message including the step of recording a voice-mail message for a plurality of recipients;
    determining whether the voice-mail message has an urgent status including the step of determining whether the voice-mail message has an urgent status for at least one of the plurality of recipients; and
    generating a call to the message recipient for delivering the message, including the steps of:
        generating a call to each respective message recipient for which the message has an urgent status immediately after a telephone line for the recipient becomes not busy when the telephone line for the message recipient is busy, and
        generating a call to each respective message recipient for which the message has an urgent status based on a predetermined schedule when the call generated to the message recipient is unanswered.

2. The method according to claim 1, wherein the step of generating the call to each respective message recipient includes the step of generating a call to each respective message recipient based on a predetermined schedule.

3. The method according to claim 2, wherein the predetermined schedule includes a predetermined call retry interval and a predetermined call retry duration, the predetermined retry interval being a predetermined period of time between each call retry and the predetermined call duration being a predetermined period of time for which call retries are attempted.

4. The method according to claim 1, wherein the predetermined schedule includes a predetermined call retry interval and a predetermined call retry duration, the predetermined retry interval being a predetermined period of time between each call retry and the predetermined call duration being a predetermined period of time for which call retries are attempted.

5. The method according to claim 4, further comprising the step of sending a signal for deactivating each respective message waiting indicator when the call generated to the message recipient is answered.

6. The method according to claim 1, further comprising the step of sending a message status call to a caller recording the message when each message recipient receives the message.

7. The method according to claim 1, further comprising the step of sending a signal for activating a message waiting indicator signal for each recipient.

8. The method according to claim 7, wherein the message waiting indicator for each recipient is a distinctive ringing signal.

9. A method of delivering a voice-mail message, comprising the steps of:
   receiving a call for accessing a voice-mail system;
   recording a voice-mail message for a recipient of the message, the recipient having a voice-mailbox within the voice-mail system including the step of recording a voice-mail message for a plurality of recipients;
   determining whether the voice-mail message has an urgent status including the step of determining whether the voice-mail message has an urgent status for at least one of the plurality of recipients; and
   generating a call to the message recipient for delivering the message including the steps of:
      generating a call to each respective message recipient for which the message has an urgent status immediately after a telephone line for the recipient becomes not busy when the telephone line for the message recipient is busy, and
      generating a call to each respective message recipient for which the message has an urgent status based on a predetermined schedule when the call generated to the message recipient is unanswered.

10. The method according to claim 9, further comprising the step of sending a signal for activating a message waiting indicator signal for each recipient.

11. The method according to claim 10, wherein the message waiting indicator for each recipient is a distinctive ringing signal.

12. The method according to claim 9, wherein the step of generating the call to each respective message recipient includes the step of generating a call to each respective message recipient based on a predetermined schedule.

13. The method according to claim 12, wherein the predetermined schedule includes a predetermined call retry interval and a predetermined call retry duration, the predetermined retry interval being a predetermined period of time between each call retry and the predetermined call duration being a predetermined period of time for which call retries are attempted.

14. The method according to claim 9, wherein the predetermined schedule includes a predetermined call retry interval and a predetermined call retry duration, the predetermined retry interval being a predetermined period of time between each call retry and the predetermined call duration being a predetermined period of time for which call retries are attempted.

15. The method according to claim 14, further comprising the step of sending a signal for deactivating each respective message waiting indicator when the call generated to the message recipient is answered.

16. The method according to claim 9, further comprising the step of sending a message status call to caller recording the message when each message recipient receives the message.

* * * * *